United States Patent [19]
Dwork et al.

[11] Patent Number: 5,539,826
[45] Date of Patent: Jul. 23, 1996

[54] METHOD FOR MESSAGE AUTHENTICATION FROM NON-MALLEABLE CRYPTO SYSTEMS

[75] Inventors: Cynthia Dwork, Palo Alto, Calif.; Simeon Naor, Tel-Aviv, Israel

[73] Assignee: International Business Machines Corporation, Armonk, N.Y.

[21] Appl. No.: 175,024

[22] Filed: Dec. 29, 1993

[51] Int. Cl.$^6$ ............................. H04L 9/32; H04L 9/30; H04L 9/00
[52] U.S. Cl. ............................. 380/25; 380/23; 380/30; 380/49
[58] Field of Search .................. 380/23, 24, 25, 380/30, 9, 49, 50; 340/825.31, 825.34

[56] References Cited

U.S. PATENT DOCUMENTS

| | | | |
|---|---|---|---|
| 4,723,284 | 2/1988 | Munck et al. | 380/25 |
| 4,853,961 | 8/1989 | Pastor | 380/21 |
| 4,935,962 | 6/1990 | Austin | 380/25 |
| 5,073,935 | 12/1991 | Pastor | 380/30 |
| 5,124,117 | 6/1992 | Tatebayashi et al. | 380/21 |
| 5,142,578 | 8/1992 | Matyas et al. | 380/21 |
| 5,142,579 | 8/1992 | Anderson | 380/30 |
| 5,144,662 | 9/1992 | Welmer | 380/10 |
| 5,144,667 | 9/1992 | Pogue, Jr. et al. | 380/45 |
| 5,148,485 | 9/1992 | Dent | 380/46 |
| 5,159,633 | 10/1992 | Nakamura | 380/30 |
| 5,164,988 | 11/1992 | Matyas et al. | 380/25 |

OTHER PUBLICATIONS

D. E. R. Denning, *Cryptography and Data Security*; (Addison–Wesley; Reading, Mass., U.S.A.; 1983); pp. 7–16.

R. E. Lennon et al., Transaction Response Message Authentication (Public Key and Des), KI881–197, vol. 26, No. 8 Jan. 1984.

R. E. Lennon et al., Public–Key Enciphering/Deciphering Transformations Using a Conventional Algorithm, vol. 25, No. 3A, pp. 1241–1249, Aug. 1982.

W. Alexi et al., RSA and Rabin Functions: Certain Parts are as Hard as the Whole, 1988 Society for Industrial and Applied Mathematics, Siam J. Comput, vol. 17, No. 2, Apr. 1988, pp. 194–209.

M. Bellare et al., How to Sign Given Any Trapdoor Function, ACM–0–89791–264–0/88 0005/0032, pp. 32–42, 1988. (Extended Abstract).

M. Blaum et al., Noninteractive Zero–Knowledge, 1991 Society for Industrial Applied Math., Siam J. Comput. vol. 20, No. 6, pp. 1084–1118, Dec. 1991.

M. Blaum et al., Non–Interactive Zero–Knowledge and Its Application (Extended Abstract), ACM–0–89791–264–0/88/0005/0103, 1988.

M. Blaum, et al., An Efficient Probabilistic Public–Key Encryption Scheme Which Hides all Partial Information, Proc. of Crypto 84, pp. 289–299.

B. Chor et al., Verifiable Secret Sharing and Achieving Simultaneity in the Presence of Faults, IEEE 0272–5428/85/0000/0383, 1985. (Extended Abstract).

(List continued on next page.)

*Primary Examiner*—Bernarr E. Gregory
*Attorney, Agent, or Firm*—James C. Pintner

[57] ABSTRACT

A method is provided for authentication of encrypted messages. A non-malleable public-key encryption technique is employed, so that an eavesdropper cannot employ an encrypted message, previously overheard, to generate a message which, when sent to a recipient, which would pass as a message originating from a valid sender. In a preferred embodiment, a protocol is provided in which, in response to a message authentication request from a sender, a recipient sends the sender a string, encrypted according to the sender's non-malleable public key. The sender decrypts the string using its private key, and sends the recipient a message which is a function of the string and the message to be authenticated. Because of the non-malleability of the public keys, an eavesdropper cannot impersonate the sender or the recipient and produce a disinformation message which would nevertheless contain the correct authorization string.

20 Claims, 3 Drawing Sheets

OTHER PUBLICATIONS

B. Chor et al., Achieving Independence in Logarithmic Number of Rounds, ACM 0–89791–239–X/87/0008/0260, pp. 260–264, 1987.

Y. Desmedt et al., Special Uses and Abuses of the Fiat–Shamir Passport Protocol, (Extended Abstract) Crypto pp. 21–39, 1987.

U. Feige et al., Witness Indistinguishable and Witness Hiding Protocols, AMC 089791–361–2/90/0005/0416, pp. 416–426, 1990.

U. Feige et al., Zero–Knowledge Proofs of Identity, J. Cryptology, pp. 77–94, 1988.

U. Feige et al., Multiple Non–Interactive Zero Knowledge Proofs Based on a single Random String, IEEE CH2925–6/90/0000/0308, FOCS 1990.

O. Goldreich et al., A Hard–Cord Predicate for all One–Way Functions, ACM 0–89791–307–8/39/0005/0025, STOC 1989.

S. Goldwasser et al., Probabilistic Encryption, J. of Computer & System Sciences 28, pp. 270–299, 1984.

S. Goldwasser et al., A Digital Signature Scheme Secure Against Adaptive Chosen–Message Attacks, Siam J. Comput, vol. 17, No. 2, pp. 281–308, Apr. 1988.

L. A. Levin, One way Functions and Pseudorandom Generators, Combinatorica 7 (4) pp. 357–363, 1987.

S. Micali et al., The Notion of Security for Probabilistic Cryptosystems, SIAM J. Comput. vol. 17., No. 2 pp. 412–426, 1988.

M. Naor et al., Universal One–Way Hash Functions and Their Cryptographic applications, ACM 0–89791–307–8/89/0005/0033, pp. 33–43, STOC 1989.

M. Noar et al., Public–key Cryptosystems Provably Secure Against Chosen Ciphertext Attacks, (Extended Abstract) ACM 089791–361–2/90/0005/0427, pp. 427–437, STOC 1990.

J. Rompel, et al., One–Way Functions are Necessary and Sufficient for Secure Signatures, ACM 089791–361–2/90/0005/0387, pp. 387–394.

M. N. Wegman et al., New Hash Functions and Their Use in Authentication and Set Equality, J. of Computer & Sys. Sciences 22, pp. 265–279, 1981.

Diffie et al., New Directions in Cryptography, IEEE Transactions on Info. Theory, vol. IT–22, No. 6, pp. 644–654, Nov. 1976.

5,539,826

METHOD FOR MESSAGE AUTHENTICATION FROM NON-MALLEABLE CRYPTO SYSTEMS

FIELD OF THE INVENTION

The present invention generally relates to the field of encryption or messages for transmission between communication nodes. More specifically, the invention relates to a public-key method for authentication of the source of an encrypted message.

BACKGROUND OF THE INVENTION

Communication systems are often used for communicating confidential messages from a sender to a receiver. Optimally, confidentiality is maintained through physical security, i.e., by communicating a confidential message in such a way that no one other than the sender or receiver has access to the message, such as in a sealed, hand-carried package, over a cable, or by means of some other closed communication medium.

Electronic communication media, such as the public telephone network or wireless transmission, have the advantage of speed and convenience. However, these media do not provide physical security. That is, it is possible for a message sent through these communication media to he overheard by parties from whom the content of the message is to be kept secret.

Therefore, a great deal of attention has been given the problem of maintaining a level of secrecy of messages which is comparable to physical security. Much of this attention has manifested itself in encryption technology. Various attributes of a cryptosystem influence how well the system maintains a message in confidence.

In particular, a cryptosystem should not be malleable. The property of malleability is discussed in connection with cryptosystems in Dolev, Dwork, and Naor, "Non-Malleable Cryptography," ACM 089791-397-3/91/004/0542, pp. 542–52 (1991). To be non-malleable, a cryptosystem has two attributes. First, the cryptosystem is semantically secure. That is, if any given information about the plaintext is computable from the ciphertext, then that given information is computable without the ciphertext. Second, given a first ciphertext, it is impossible, or computationally infeasible, to generate a second ciphertext such that the plaintexts corresponding with the first and second ciphertexts are related.

The disadvantage of malleability is illustrated as follow: When a set of related messages are encrypted using an algebraic cryptosystem, the resultant encrypted messages sometimes have a corresponding (not necessarily identical) relationship. For instance, if a set of messages have close numerical values in an ascending numerical series, some malleable encryption keys encrypt the messages into a set of encrypted messages which also have close values in an ascending series. While the message may still be difficult to decrypt, an eavesdropper can still make illicit use of the encrypted message.

For example, consider a contract bidding scenario. Suppose that a municipality has voted to construct a new school, has chosen a design, and advertises that construction companies are invited to bid for the contract by submitting bids encrypted using a malleable public key E. Company A encrypts a bid of $1,500,000 using E, and sends the bid over an insecure line. Company B receives the bid, but cannot decrypt the bid because it does not have the municipality's private decrypting key.

However, given the encrypted Company A bid, Company B may be able to produce a message or its own which, when decrypted using the municipality's decrypting key, results in a bid lower than that of Company A. The cryptosystem is malleable if, given the encrypted bid from Company A, Company B has a likelihood of producing such a message which is greater than its likelihood of doing so would be if Company B did not have the encrypted Company A bid. Company B can thus slightly underbid Company A and win the contract, without necessarily knowing what Company A's bid was, or even what its own decrypted bid will be. Clearly, Company A's interests are served by employing a non-malleable cryptosystem, so that Company B is prevented from generating a bid in this fashion.

This scenario illustrates the difference between physical security, in which Company has no access even to Company A's encrypted bit, and secrecy, produced by encrypting messages. In some contexts, such as this scenario, mere secrecy through the use of a malleable cryptosystem is not a satisfactory substitute for physical security.

A particular area in which secrecy desirably should match physical security is the area of authentication of the source of an encrypted message. Desirably, an authentication scheme should have two attributes. First, the scheme should be secure against attack from an interloper. That is, an interloper should not be able to send a disinformation to a recipient and authenticate the disinformation message as being a valid message sent from a legitimate sender. If no reliable message authentication scheme is in place, then a message received by a recipient R and bearing the source address of a sender S could in fact have been sent by an interloper B. Thus, B could send disinformation about S to R.

The second desirable attribute of an authentication scheme is that it should be possible for the recipient R to convince a third party C that the message was in fact sent from the sender S, and not from an imposter B.

An example of a scenario in which authentication is desirable is a scenario called the "chessmaster attack," or "mafia scam." The name is derived from a chess scenario in which a player simultaneously plays white against one grandmaster and black against another. The player effectively plays the two grandmasters against each other by duplicating the moves made by each grandmaster against the other.

The chessmaster attack is illustrated in a scenario called "Identification: Friend or Foe", or IFF. In one possible IFF scenario, a friendly aircraft F and a friendly ground site $G_F$ communicate, and an enemy aircraft N, with the cooperation of an enemy ground site $G_N$, seek to communicate disinformation to the friendly aircraft and ground site by impersonating them.

A conventional attempt to establish secure communications is to give the friendly aircraft some secret information s, known only to the friendly ground site. The friendly ground site selects one of a large number of challenges q, and sends q to the friendly aircraft. The friendly aircraft responds with a function F of s and q which is computationally infeasible to calculate without s. Of course, the enemy aircraft may also receive the function. If, later, the friendly ground station challenges the enemy aircraft with a different challenge q', then the required response, a function of s and q', cannot easily be produced, given only q and F(s,q).

However, in a malleable cryptosystem, this communication protocol is subject to attack, using a mafia scam technique. Consider the following sequence of messages, in which the expression following the colon is the message (i.e., a challenge or a response) sent from the first party to the second party:

$G_f \to N$: q
$N \to G_N$: q
$G_N \to F$: q
$F \to G_N$: f(s,q)
$G_N \to N$: f(s,q)
$N \to G_F$: f(s,q)

In this sequence, an enemy plane and ground site, working together, interpose themselves between the friendly ground site and the friendly aircraft, in the manner of a mafia scam. In the fourth step, the Friendly aircraft F provides the enemy ground site with the encrypted response f(s,q). Then, in the sixth step, the enemy aircraft sends the encrypted response to the friendly ground site, thereby responding correctly to the challenge from the friendly ground site.

It is possible for the friendly ground site to decent the enemy's copying by including some special locater information, such as the location of the friendly plane and a time stamp, in the challenge, designated q'. As a result, the enemy plane would need to transmit f(s,q') rather than f(s,q), so mere copying would be insufficient to attack the friendly communication system.

However, the two challenges q and q' are the same, except for the location and the time stamp. In a malleable cryptosystem, f(s,q) and f(s,q') are likely to be similar. Thus, given q, q', and f(s,q), it may be possible for the enemy to obtain f(s,q') and defeat the friendly cryptosystem.

Accordingly, there is a need for a cryptosystem which facilitates the authentication of secret messages, which is not malleable, and therefore not vulnerable to the sort of attacks described above.

SUMMARY OF THE INVENTION

Therefore, it is an object of the invention to provide a method and system for authenticating messages which is non-malleable.

To achieve these and other objectives, there is provided in accordance with the invention a method and system in which a public key cryptosystem, employing non-malleable public and private keys, is used for message authentication. A message authentication protocol is employed which, used with the non-malleable public key cryptosystem, provides authentication which is secure from tampering from an eavesdropper/imposter.

The protocol includes the following: In response to a first message received by a recipient and apparently sent by a sender, the responder sends an authentication string which is encrypted with the apparent sender's public key. The sender, who actually did send the first message, uses its private decryption key to decrypt the authentication string. The sender then sends an authentication message which is a function of the first message and the authentication string.

The above protocol provides authentication of the sender's identity to the recipient because only then sender is able to decrypt the string, which was encrypted using the sender's public key. Moreover, in accordance with the invention, the above protocol is reliable because, since the public key cryptosystem used is non-malleable, no eavesdropper/imposter could have generated the authentication message From the encrypted authentication string.

While the invention is primarily disclosed as a method, it will be understood by a person of ordinary skill in the art that an apparatus, such as a conventional data processor, including a CPU memory, I/O, program storage, a connecting bus, and other appropriate components, could be programmed or otherwise designed to facilitate the practice of the method of the invention. Such a processor would include appropriate program means for executing the method of the invention. Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENTS

Figure 1:
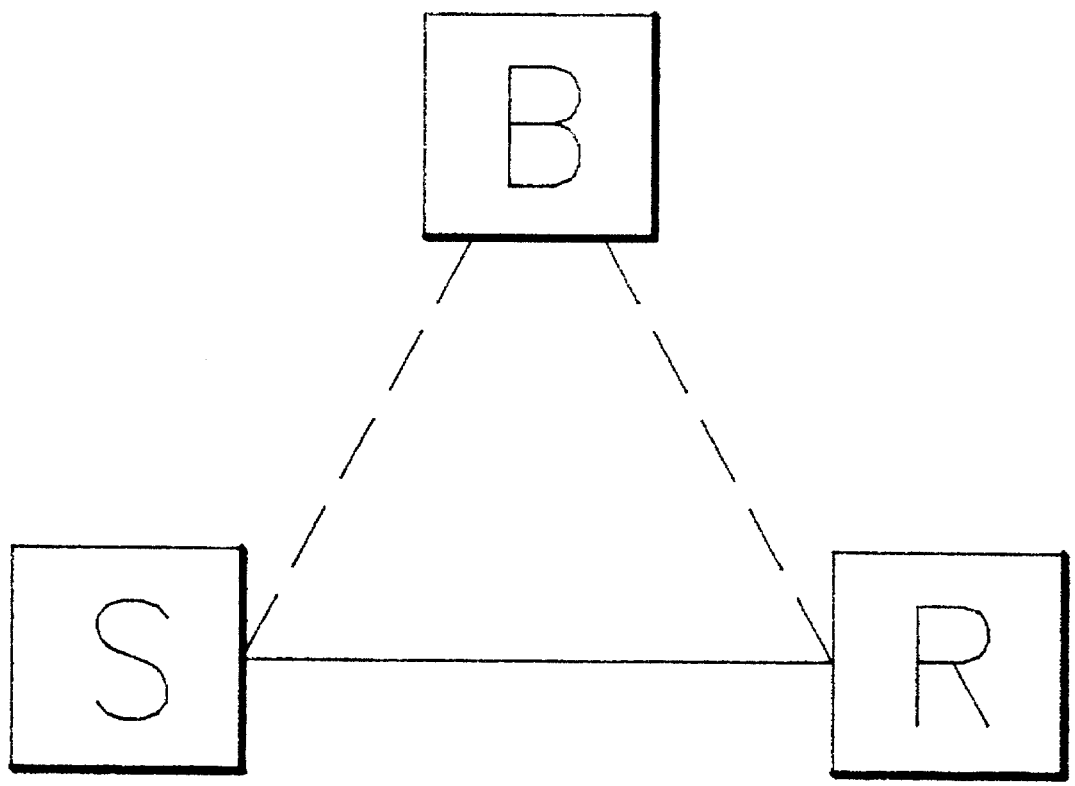
FIG. 1 is a system block diagram showing two communication devices, S and R, and an interloper B.

The following discussion is applicable to any communication system in which a sender sends a message to a recipient, in which the origin of the message is to be authenticated, and in which an interloper, attempting to send the recipient a disinformation message perportedly from the sender, is to be prevented from doing so. The precise nature of the communication medium and of the sender, recipient, and interloper are not essential to the invention. FIG. 1 is a block diagram representation which schematically shows such a system, including n sender S, a recipient R, and an interloper B.

The technique for message authentication according to the invention includes the use of a public key cryptosystem. A public key cryptosystem was first presented in Diffie and Hellman, "New Directions in Cryptography," I.E.E.E. Transactions on Information Theory, Vol. IT-22, No. 6, pp. 644–54 (November 1976).

In a public-key cryptosystem operable by a plurality of communication nodes, for each node A, there is a public encryption key $E_A$ which is known to all of the other nodes. Each public encryption key $E_A$ describes a procedure for encrypting messages to be sent to the respective node A. For each public encryption key, there is n corresponding private decrypting key known only to the respective node, and which cannot be deduced, given the public encryption key. Therefore, if a message is encoded using the public encryption key $E_A$, then, although any other node can receive the encrypted message, only the node A can decrypt it. Even the sending node cannot decrypt the message, once it has been encrypted.

Public-key cryptosystems first proposed in Diffie et al. are based on the difficulty of computing logarithms mod q, where q is a prime number of elements making up a field. For a quantity representable as a b bit number, where q is a prime number slightly less than $2^b$, encryption or decryption using keys as described in Diffie et al. requires exponentiation that takes at most 2b multiplications mod q. However, decrypting a ciphertext without the key requires taking logarithms with $2^{**}(b/2)$ operations. Thus, cryptanalysis requires a computational effort which grows exponentially, relative to legitimate encryption or decryption by parties who know the respective keys.

However, because of the dependence on modulo arithmetic, ciphertexts corresponding with ascending plaintexts are piecewise ascending. Thus, the conventional Diffie et al. public key cryptography is malleable, and subject to the attacks described above. In accordance with the invention, this drawback is overcome through the use of a non-malleable cryptosystem. While any non-malleable cryptosystem may be employed in accordance with the invention, a preferred non-malleable cryptosystem is that given in Section 4 of Dolev et al., "Non-Malleable Cryptography," cited in the Background.

Diffie et al. discusses the problem of authentication, and suggests a one-way authentication system in which a sender "deciphers" the message to be sent, using the sender's private key. The recipient then uses the sender's public key to "encrypt" the "decrypted" message to recover the message itself. Since only the sender could have used the sender's private key, recovering the message using the sender's public key is proof that the sender sent the message.

However, because of the malleability of the Diffie et al. cryptography, it is likewise vulnerable to an attack in which a message is falsely "authenticated" as being from a given sender, where in fact is was sent by an interloper. A non-malleable public key authentication method in accordance with the invention is advantageously secure against such false authentication.

Figure 2:
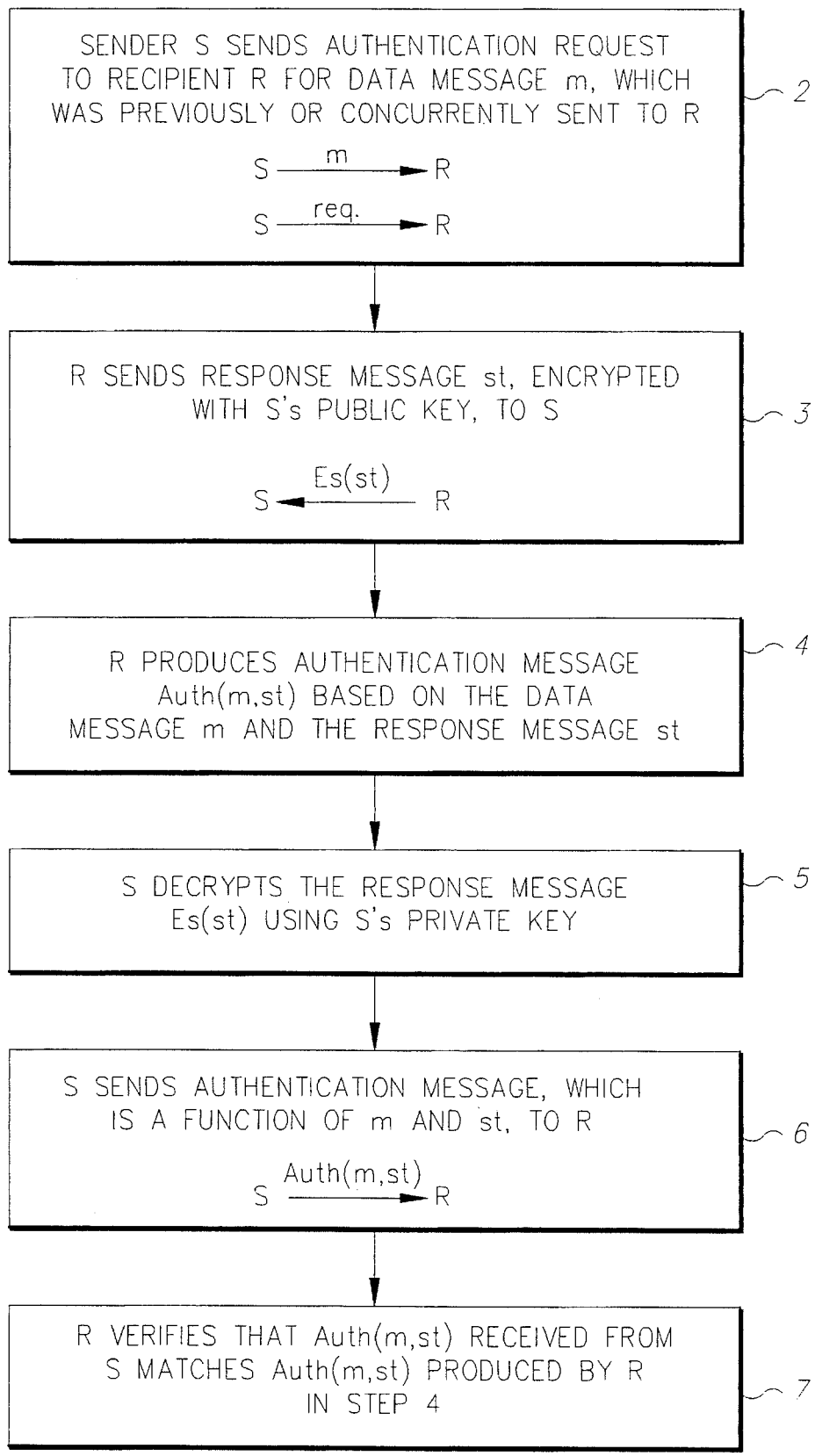
FIG. 2 is a flowchart showing an exchange of messages for an authentication sequence according to the method of the invention.

Given a suitable non-malleable cryptosystem, the method of the invention works as set forth in the flowchart of FIG. 2. The steps of FIG. 2 show communication traffic between a sender S and a recipient R. The objective is to authenticate a data message m, which is to be sent from S to R.

In a first step 2, the sender S sends an authorization request message which indicates that S desires to authenticate the data message m. The authorization request message may include the data message m itself, or may be a command message in accordance with a suitable command format or protocol in use with the communication system supporting the senders and the receiver R. In this latter case, it is assumed that the data message m itself is sent separately. In effect, the authorization request message is a statement, "I am S, and I wish to authenticate a data message M which I am sending to you."

In step 3, the receiver R responds by sending a response message, preferably a random string st, encrypted using the sender's public key $E_S$. The string st is preferably chosen at random, or may be based on some predetermined formula. For instance, the string st might be related to a date or time stamp. The sender s decrypts the response message using its private key (step 5).

In step 6, the senders S sends the recipient R an authorization message, from which the recipient R is able to establish that the identity of the sender of the data message m is, in fact, the sender S. In a preferred embodiment of the invention, the authorization message is in the form Auth(m, st), where Auth is a function mutually agreed upon between the sender S and the receiver R. Auth is preferably an easily computed function which takes as arguments a message, such as the message m to be authenticated, and a string, such as st which was sent to S from R (in encrypted form) in step 3, and which S decrypted in step 5. Auth produces an output, preferably in the form of a short string. It is that output, or short string, which is actually sent from the sender S to the recipient R. For any two strings st and st', the probability that Auth(m,st) equals Auth(m,st') should be low.

Additionally, it is preferable that, given m, st, and the output or short string, the recipient R can easily verify that Auth(m,st) equals the output sent from S to R as the authorization message. Thus, when R verifies that the authorization message it received matches the Auth function of the data message m, which R has already received, and st, the string which R sent to S(step 7), R thereby verifies that the identity of the sender of the data message m is in fact S.

It is preferable, though not essential to the invention, that the recipient R's public key be used by the sender S to encrypt the authorization request message (assuming that the encrypted data message m was sent separately), and the authorization message Auth(m,st).

To foil an attempt by an imposter B to impersonate the sender S, the public encryption key E, must be non-malleable. Otherwise, this authorization sequence would be subject to attack, for instance from the mafia scam. Such a scam would work as shown in the flowchart of FIG. 3.

Assume that S wants to send a data message m to R, and that the imposter B wants to send a disinformation message m' to R im place of S's message m, and to authenticate m' as having come from S. The disinformation message m' has some relationship to the data message m, i.e., m'=f(m). Because, for the purpose of this illustration, the sender S's public key $E_S$ is malleable, it is reasonably easy for B to calculate an $E_S(st)$, given $E_S(st')$, m, and m', such that there is a relationship between st and st'.

Figure 3:
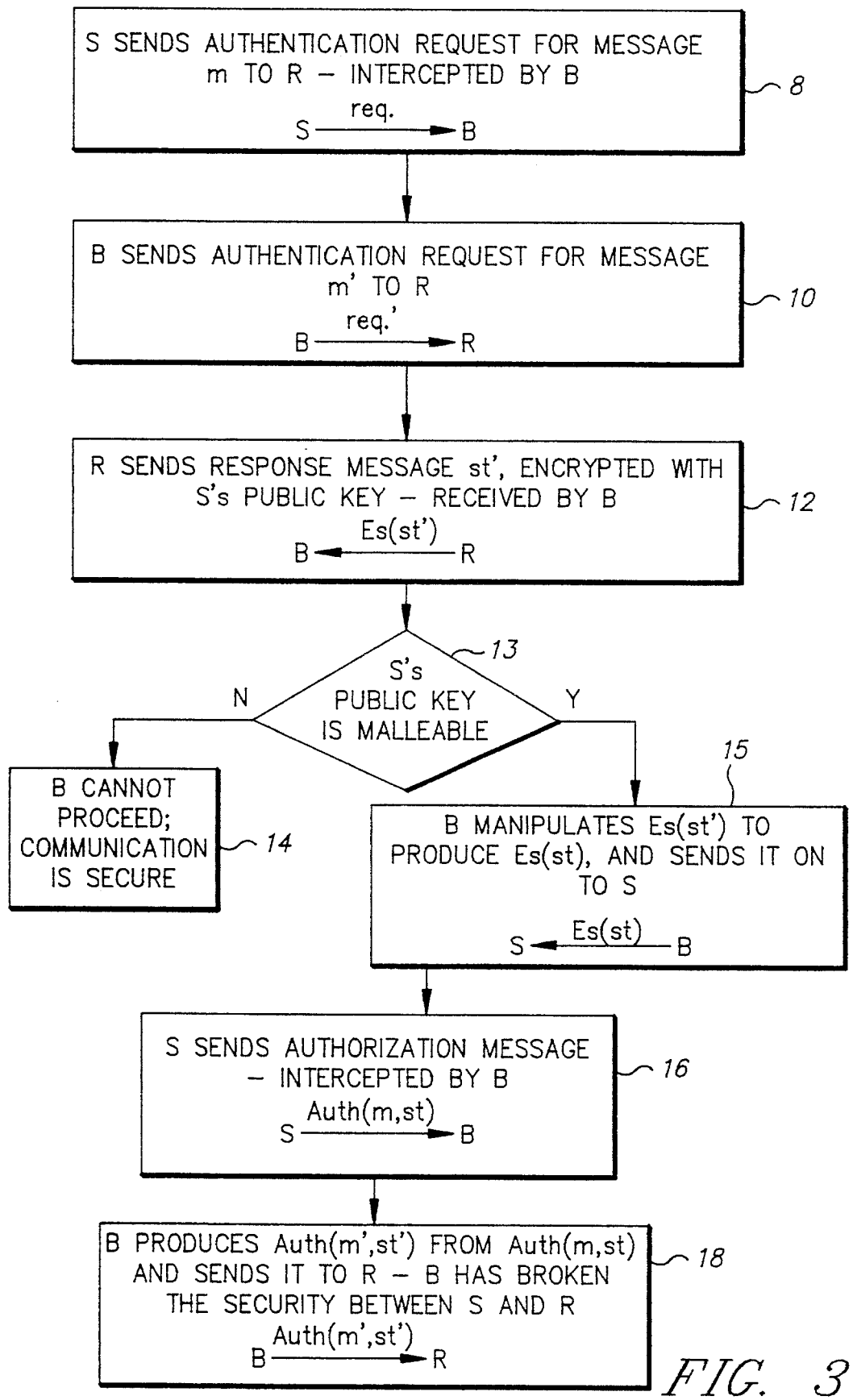
FIG. 3 is a flowchart showing an exchange of messages for an authentication sequence between a sender and a recipient, in which a third party attempts to authenticate a message which did not originate from the sender.

The mafia scam exchange goes as shown in FIG. 3. In step 8, the sender S sends an authentication request, directed to the recipient R, to authenticate a data message m. The request is intercepted by B. In step 10, B sends R an authentication request, identifying itself as S, and requesting authentication of a disinformation message m', which has a given relationship to m.

R responds to B's request, in step 12, by sending a string st', encrypted using S's public key. B cannot decrypt the encrypted string. If, in accordance with the invention, S's public key is non-malleable (step 13), B's attempt to authenticate m' does not get beyond this point. B's attempt is frustrated, and the method of the invention has successfully maintained communication security (step 14).

However, if S's public key is malleable, B can manipulate $E_S(st')$ to produce an encrypted message $E_S(st)$, where Auth(m',st')=g(Auth(m,st)), for some easily computable function g. In step 14, B sends $E_S(st)$ to S.

S then attempts to complete the authorization by sending Auth(m,st) in step 16. B again intercepts this message, applies the function g to it to produce Auth(m',st'), and, in step 18, sends the latter to R. R then believes that S has authenticated the disinformation message m', and B has succeeded in its mafia scam.

However, the success of the mafia scam depends on the malleability of S's public key $E_S$. If, in accordance with the invention, the public key is not malleable, B is unable to generate $E_S(st)$ from $E_S(st')$, and the mafia scam fails. Thus, the invention advantageously protects this authentication sequence from attack.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. For use with a communication and processing device, a non-malleable public-key encryption method for authentication of a data message received by the communication and processing device, the method comprising the computer-implemented steps of:

receiving a data message;

receiving an authentication request message which was apparently sent by a given sender, the given sender apparently having sent the data message;

responding to the authentication request message, the step of responding including sending a response message encrypted with the given sender's non-malleable public encryption key; and receiving an authentication message which is a function of the data message and the response message;

concluding, based on the fact that the authentication message could have produced only by someone with access to the response message in plaintext form, and the fact that only the given sender could have decrypted the response message that had been encrypted with the given sender's public key, that the given sender had been the sender of the data message, since the given sender would not have produced and sent the authentication message if the given sender had not been the sender of the data message.

2. A method as recited in claim 1, wherein the step of responding includes sending a random string as the response message.

3. For use with a communication and processing device, a non-malleable public-key encryption method for authentication of a data message sent by the communication and processing device to a given receiving device, the method comprising the computer-implemented steps of:

sending a data message to a given receiving device;

sending a first message requesting authentication of the data message from the given receiving device;

receiving, from the given receiving device, a response message encrypted using the communication device's public key; and decrypting the received message, using the communication device's private decrypting key, to obtain the response message; and sending an authentication message which is related to the data message and the response message;

thereby proving to the given receiving device, based on the fact that the authentication message could have produced only by someone with access to the response message in plaintext form, and the fact that only a given sender could have decrypted the response message that had been encrypted with the given sender's public key, that the given sender had been the sender of the data message, since the given sender would not have produced and sent the authentication message if the given sender had not been the sender of the data message.

4. For use by a communication and processing node S, which sends messages to and receives messages from other nodes over a communication medium, a non-malleable public key method for verifying that a data message M, received by a specified one of the other nodes R, encrypted using the node R's public key $E_R$, was sent by the node S, the method comprising the computer-implemented steps of:

sending a data message M;

receiving, from the node R, a response message st encrypted using the node S's public key $E_S$;

decrypting the response message st;

producing an authentication message Auth(M,st), Auth being a function that produces an output, given a message argument and a string argument, such that the probability is low that for any two different string arguments, Auth produces the same output;

transmitting the authentication message Auth(M,st) to the node R; and proving thereby, to the node R, based on the fact that the authentication message Auth(M,st) could have produced only by someone with access to the response message st in plaintext form, and the fact that only S could have decrypted the response message st that had been encrypted with S's public key, that S had been the sender of the data message M, since S would not have produced and sent the authentication message Auth(M, st) if S had not been the sender of the data message M.

5. For use by a communication and processing node R, which sends messages to and receives messages from other nodes over a communication medium, a non-malleable public key method for verifying that a data message M, received by the node R, encrypted using the node R's public key $E_R$, and bearing a sender identification of one of the other nodes S, was sent by the node S, the method comprising the computer-implemented steps of:

receiving a data message M;

receiving an authentication request message that was apparently send by the node S, the node S apparently having sent the data message M;

transmitting a response message st encrypted using the node S's public key $E_S$;

producing an authentication message Auth(M,st), Auth being a function that produces an output, given a message argument and a string argument, such that the probability is low that for any two different string arguments, Auth produces the same output;

receiving an authentication message;

verifying that the received authentication message matches the authentication message Auth(M,st) produced in the step of producing; and concluding, based on the fact that the authentication message Auth(M,st) could have produced only by someone with access to the response message st in plaintext form, and the fact that only S could have decrypted the response message st that had been encrypted with S's public key, that S had been the sender of the data message M, since S would not have produced and sent the authentication message Auth(M, st) if S had not been the sender of the data message M.

6. A method as recited in claim 5, wherein the response message st is a random string.

7. A communication and processing device, which employs a non-malleable public-key encryption for authentication of a data message received by the communication and processing device, the communication and processing device comprising:

means for receiving a data message;

means for receiving an authentication request message which was apparently sent by a given sender, the given sender apparently having sent the data message;

means for responding to the authentication request message, the means for responding including means for sending a response message encrypted with the given sender's non-malleable public encryption key;

means for receiving an authentication message which is a function of the data message and the response message; and means for concluding, based on the fact that the authentication message could have produced only by someone with access to the response message in plaintext form, and the fact that only the given sender could have decrypted the response message that had been encrypted with the given sender's public key, that the given sender had been the sender of the data message, since the given sender would not have produced and sent the authentication message if the given sender had not been the sender of the data message.

8. A communication and processing device as recited in claim 7, wherein the means for responding includes means for sending a random string as the response message.

9. A communication and processing device, which employs a non-malleable public-key encryption method for authentication of a data message sent by the communication and processing device to a given receiving device, the communication and processing device comprising:

means for sending a data message to a given receiving device;

means for sending, to the given receiving device, a first message requesting authentication of the data message;

means for receiving, from the given receiving device, a response message encrypted using the communication device's public key;

means for decrypting the received message, using the communication device's private decrypting key, to obtain the response message; and means for sending an authentication message which is related to the data message and the response message;

means for proving, thereby, to the given receiving device, based on the fact that the authentication message could have produced only by someone with access to the response message in plaintext form, and the fact that only a given sender could have decrypted the response message that had been encrypted with the given sender's public key, that the given sender had been the sender of the data message, since the given sender would not have produced and sent the authentication message if the given sender had not been the sender of the data message.

10. A communication node S comprising:

means for sending messages to and receiving messages from other nodes over a communication medium; and non-malleable public key means for verifying that a message M, received by a specified one of the other nodes R, encrypted using the node R's public key $E_R$, was sent by the node S, the means for verifying comprising:

(i) means for receiving, from the node R, a response message st encrypted using the node S's public key $E_S$;

(ii) means for decrypting the response message st;

(iii) means for producing an authentication message Auth(M,st), Auth being a function that produces an output, given a message argument and a string argument, such that the probability is low that for any two different string arguments, Auth produces the same output;

(iv) means for transmitting the authentication message Auth(M,st) to the node R; and (v) means for proving, thereby, to the node R, based on the fact that the authentication message Auth(M,st) could have produced only by someone with access to the response message st in plaintext form, and the fact that only S could have decrypted the response message st that had been encrypted with S's public key, that S had been the sender of the data message M, since S would not have produced and sent the authentication message Auth(M,st) if S had not been the sender of the data message M.

11. A communication node R comprising:

means for sending messages to and receiving messages from other nodes over a communication medium; and non-malleable public key means for verifying that a data message M, received by the node R, encrypted using the node R's public key $E_R$, and bearing a sender identification of one of the other nodes S, was sent by the node S, the means for verifying comprising:

(i) means for receiving a data message M;

(ii) means for receiving an authentication request message that was apparently sent by the node, S the node S apparently having sent the data message M;

(iii) means for transmitting a response message st encrypted using the node S's public key $E_S$;

(iv) means for producing an authentication message Auth(M,st), Auth being a function that produces an output, given a message argument and a string argument, such that the probability is low that for any two different string arguments, Auth produces the same output;

(v) means for receiving an authentication message;

(vi) means for verifying that the received authentication message matches the authentication message Auth(M,st) produced in the step of producing; and means for concluding, based on the fact that the authentication message Auth(M,st) could have produced only by someone with access to the response message st in plaintext form, and the fact that only S could have decrypted the response message st that had been encrypted with S's public key, that S had been the sender of the data message M, since S would not have produced and sent the authentication message Auth(M,st) if S had not been the sender of the data message M.

12. A communication and processing node R as recited in claim 11, wherein the response message st is a random string.

13. For use with a communication device, a computer program product for directing the communication device to authenticate a data message received by the communication device using a non-malleable public-key encryption method, the computer program product comprising:

a recording medium;

means, recorded on the recording medium, for directing the communication device to receive a data message;

means, recorded on the recording medium, for directing the communication device to receive an authentication message which was apparently sent by a given sender, the given sender apparently having sent the data message;

means, recorded on the recording medium, for directing the communication device to respond to an authentication request message which was apparently sent by a given sender, the given sender apparently having sent the data message, the step of responding including sending a response message encrypted with the given sender's non-malleable public encryption key;

means, recorded on the recording medium, for directing the communication device to receive an authentication message which is a function of the data message and the response message; and means, recorded on the recording medium, for directing the communication device to conclude, based on the fact that the authentication message could have produced only by someone with access to the response message in plaintext form, and the fact that only the given sender could have decrypted the response message that had been encrypted with the given sender's public key, that the given sender had been the sender of the data message, since the given sender would not have produced and sent the authentication message if the given sender had not been the sender of the data message.

14. A computer program product as recited in claim 13, wherein the means for directing to respond includes means, recorded on the recording medium, for directing the communication device to send a random string as the response message.

15. For use with a communication device, a computer program product for directing the communication device to authenticate a data message sent by the communication device to a given receiving device using a non-malleable public key encryption method, the computer program product comprising:

a recording medium;

means, recorded on the recording medium, for directing the communication device to send a data message to a given receiving device;

means, recorded on the recording medium, for directing the communication device to send a first message requesting authentication of the data message from the given receiving device;

means, recorded on the recording medium, for directing the communication device to receive, from the given receiving device, a response message encrypted using the communication device's public key;

means, recorded on the recording medium, for directing the communication device to decrypt the received message, using the communication device's private decrypting key, to obtain the response message;

means, recorded on the recording medium, for directing the communication device to send an authentication message which is related to the data message and the response message; and means, recorded on the recording medium, for directing the communication and processing device to prove, thereby, to the given receiving device based on that the authentication message could have produced only by someone with access to the response message in plaintext form, only the given sender could have decrypted the response message that had been encrypted with the given sender's public key, thereby proving to the communication and processing device that the given sender had been the sender of the data message, since the given sender would not have produced and sent the authentication message if the given sender had not been the sender of the data message.

16. For use with a communication node S, which sends messages to and receives messages from other nodes over a communication medium, a computer program product for directing the node S to verify that a message M, received by a specified one of the other nodes R, encrypted using the node R's public key $E_R$, was sent by the node S using a non-malleable public key encryption method, the computer program product comprising: a recording medium;

means, recorded on the recording medium, for directing the communication nodes to receive, from the node R, a response message st encrypted using the node S's public key $E_S$;

means, recorded on the recording medium, for directing the communication nodes to decrypt the response message st;

means, recorded on the recording medium, for directing the communication nodes to produce an authentication message Auth(M,st), Auth being a function that produces an output, given a message argument and a string argument, such that the probability is low that for any two different string arguments, Auth produces the same output;

means, recorded on the recording medium, for directing the communication nodes to transmit the authentication message Auth(M,st) to the node R; and means, recorded on the recording medium, for directing the communication device to prove, thereby, to the node R, based on the fact that the authentication message Auth(M,st) could have produced only by someone with access to the response message st in plaintext form, and the fact that only S could have decrypted the response message st that had been encrypted with S's public key, that S had been the sender of the data message M, since S would not have produced and sent the authentication message Auth(M, st) if S had not been the sender of the data message M.

17. For use with a communication node R, which sends messages to and receives messages from other nodes over a communication medium, a computer program product for directing the node R to verify that a message M, received by the node R, encrypted using the node R's public key $E_R$, and bearing a sender identification of one of the other nodes S, was sent by the node S using a non-malleable public key method, the computer program product comprising:

a recording medium;

means, recorded on the recording medium, for directing the communication node R to receive a data message M;

means, recorded on the recording medium, for directing the communication node R to receive an authentication request message that apparently was sent by the node S, the node S apparently having sent the data message M;

means, recorded on the recording medium, for directing the communication node R to transmit a response message st encrypted using the node S's public key $E_s$;

means, recorded on the recording medium, for directing the communication node R to produce an authentication message Auth(M,st), Auth being a function that produces an output, given a message argument and a string argument, such that the probability is low that for any two different string arguments, Auth produces the same output;

means, recorded on the recording medium, for directing the communication node R to receive an authentication message;

means, recorded on the recording medium, for directing the communication node R to verify that the received authentication message matches the authentication message Auth(M,st) produced in the step of producing; and means, recorded on the recording medium, for directing the communication device to conclude, based on the fact that the authentication message Auth(M,st) could have produced only by someone with access to the response message st in plaintext form, and the fact that only S could have decrypted the response message st that had been encrypted with S's public key, that S had been the sender of the data message M, since S would not have produced and sent the authentication message Auth(M,st) if S had not been the sender of the data message M.

18. A computer program product as recited in claim 17, wherein the response message st transmitted under the direction of the means for directing to transmit is a random string.

19. A non-malleable public-key encryption method for authentication by a communication and processing device R of a data message sent by a communication and processing device S to R, the method comprising the computer-implemented steps of:

S performing the step of sending a first message requesting authentication of the data message from R;

R performing the step of responding to the authentication request message, which, from R's perspective, was apparently sent by S, S apparently having also sent the data message, by sending a response message encrypted with S's non-malleable public encryption key;

S receiving, apparently from R, a response message encrypted using S's public key; and S performing the step of decrypting the received response message, using S's private decrypting key, to obtain a plaintext version of the response message;

S performing the step of sending an authorization message which is related to the data message and the response message;

R receiving the authentication message; and

R concluding, based on the fact that the authentication message could have produced only by someone with access to the response message in plaintext form, and the fact that only S could have decrypted the response message that had been encrypted with S's public key, that S had been the sender of the data message, since S would not have produced and sent the authentication message if S had not been the sender of the data message.

20. For use by communication and processing nodes S and R, which send messages to and receives messages from each other, and to and from other nodes, over a communication medium, a non-malleable public key method for verifying, by the node R, that a message M, received by the node R, encrypted using the node R's public key $E_R$, and bearing a sender identification of the node S, was sent by the node S, the method comprising the computer-implemented steps of:

the node R performing the step of transmitting a response message st encrypted using the node S's public key $E_S$;

the node R performing the step of producing an authentication message Auth(M,st), Auth being a function that produces an output, given a message argument and a string argument, such that the probability is low that for any two different string arguments, Auth produces the same output;

the node S receiving, from the node R, the response message st encrypted using the node S's public key $E_S$;

the node S performing the step of decrypting the response message st;

the node S performing the step of producing an authentication message Auth(M,st), Auth being the same function used by the node R;

the node S performing the step of transmitting the output Auth(M,st) to the node R;

the node R receiving the authentication message Auth(M, st);

the mode R performing the step of verifying that the received authentication message matches the authentication message Auth(M,st) produced in the step of producing; and the node R concluding, based on the fact that the authentication message Auth(M,st) could have produced only by someone with access to the response message st in plaintext form, and the fact that only S could have decrypted the response message st that had been encrypted with S's public key, that S had been the sender of the data message M, since S would not have produced and sent the authentication message Auth(M, st) if S had not been the sender of the data message M.

* * * * *

UNITED STATES PATENT AND TRADEMARK OFFICE
CERTIFICATE OF CORRECTION

PATENT NO. : 5,539,826

DATED : June 23, 1996

INVENTOR(S) : Cynthia Dwork and Simeon Naor

It is certified that error appears in the above-identified patent and that said Letters Patent is hereby corrected as shown below:

Column 5, line 51: change "3" to --4--

Column 7, line 22: after "have" insert --been--

Column 7, line 53: before "produced" insert --been--

Column 8, line 13: after "have" insert --been--

Column 8, line 47: after "have" insert --been--

Column 9, line 7: after "have" insert --been--

Column 9, line 38: after "have" insert --been--

Column 10, line 3: after "have" insert --been--

Column 10, line 36: after "have" insert --been--

Column 11, line 7: after "have" insert --been--

Column 11, line 51: after "on" insert --the fact--

Column 11, line 52: after "have" insert --been--

Column 11, line 54: after "form," insert --and the fact that--

Column 12, line 2: after "comprising:" start a new paragraph

Column 12, line 23: after "have" insert --been--

UNITED STATES PATENT AND TRADEMARK OFFICE
CERTIFICATE OF CORRECTION

PATENT NO.   : 5,539,826
DATED        : June 23, 1996
INVENTOR(S)  : Cynthia Dwork and Simeon Naor It is certified that error appears in the above-identified patent and that said Letters Patent is hereby corrected as shown below:

Column 13, line 2:   after "have"  insert --been--

Column 13, line 29:  delete "and"

Column 13, line 38:  after "have"  insert --been--

Column 14, line 36:  after "have"  insert --been--

Signed and Sealed this

Twenty-sixth Day of November 1996

*Attest:*

BRUCE LEHMAN

*Attesting Officer*           *Commissioner of Patents and Trademarks*